(12) United States Patent
Pasumansky et al.

(10) Patent No.: US 6,477,536 B1
(45) Date of Patent: Nov. 5, 2002

(54) VIRTUAL CUBES

(75) Inventors: Mosha Pasumansky, Bellevue; Alexander Berger, Redmond; Amir Netz, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/337,828

(22) Filed: Jun. 22, 1999

(51) Int. Cl.[7] .............................................. G06F 17/30
(52) U.S. Cl. ........................ 707/102; 707/103; 707/4; 707/101
(58) Field of Search ................................ 707/103, 2, 3, 707/4, 5, 101, 102

(56) References Cited

U.S. PATENT DOCUMENTS

| | | | | |
|---|---|---|---|---|
| 5,799,300 A | * | 8/1998 | Agrawal et al. | 707/5 |
| 5,822,751 A | * | 10/1998 | Gray et al. | 707/3 |
| 5,918,232 A | * | 6/1999 | Pouschine et al. | 707/103 |
| 6,094,651 A | * | 7/2000 | Agrawal et al. | 707/5 |
| 6,122,628 A | * | 9/2000 | Castelli et al. | 707/5 |
| 6,141,655 A | * | 10/2000 | Johnson et al. | 707/2 |
| 6,161,103 A | * | 12/2000 | Rauer et al. | 707/4 |
| 6,282,544 B1 | * | 8/2001 | Tse et al. | 707/101 |

* cited by examiner

Primary Examiner—Charles L. Rones
(74) Attorney, Agent, or Firm—Woodcock Washburn LLP (57) ABSTRACT

Systems and methods for creating and maintaining virtual cubes are disclosed. A virtual cube is a logical representation of a subset of the dimensions and measures of at least one physical cube maintained by an OLAP server. Metadata defines the mappings from the dimensions and measures of the virtual cube to the dimensions and measures of the physical cube. Client applications can manipulate the virtual cube as if it were a physical cube.

18 Claims, 5 Drawing Sheets

VIRTUAL CUBES

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

FIELD

The present invention pertains generally to computer-implemented databases, and more particularly to representing virtual cubes in such databases.

BACKGROUND

Online analytical processing (OLAP) is a key part of most data warehouse and business analysis systems. OLAP services provide for fast analysis of multidimensional information. For this purpose, OLAP services provide for multidimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

A fundamental entity that is present in typical OLAP databases is a cube. A cube is a multidimensional representation of a set of data having varying aspects. A cube comprises a set of dimensions and a set of measures. In this context, a dimension is a structural attribute of the cube that is a list of members of a similar type in the user's perception of the data. Typically, there is a hierarchy associated with the dimension. For example, a time dimension can consist of days, weeks, months, and years, while a geography dimension can consist of cities, states/provinces, and countries. Dimension members act as indices for identifying a particular cell or range of cells within a multidimensional array.

A measure is a structural attribute of the cube that comprises a particular type of value that provides detail data for particular members within the dimensions. For example, sale amounts and units sold can be measures of a retail cube having a time dimension and a geography dimension. The measures provide the sale amounts and units sold for a particular geographic region at a particular point in time.

While cubes in OLAP systems represent a convenient and flexible mechanism for representing multidimensional data, several problems remain. First, current OLAP systems do not provide a mechanism for performing cross cube analysis. Cross cube analysis involves the analysis of measures from different cubes across similar dimensions. For example, consider a cube "product" that contains product cost data over time, and a cube "retail" that has sales data over time. In this example, it is desirable to compare cost data with sales data, however in current systems the analysis must be performed in multiple stages because the source data resides in different cubes. The cost data must be extracted from the cube and held in temporary variable locations. The sales data must then be extracted from the retail cube. Finally, the data can be analyzed.

A second problem with the implementation of cubes in current systems is that there is little flexibility in defining security parameters for a cube. Current systems typically implement an all or none access scheme for the cube. That is, if a user has access to any cell in a cube, the user has access to all the cells in the cube. Given that cubes can have many dimensions and measures, some representing sensitive data and other dimensions having public data, all or none security is undesirable.

Thus there is a need in the art for a system that can simultaneously represent and present for analysis data from multiple cubes. In addition, there is a need for a system that provides data security by exposing only a subset of the cube to a user.

SUMMARY

The above-mentioned shortcomings, disadvantages and problems are addressed by the present invention, which will be understood by reading and studying the following specification.

Systems and methods for creating and accessing virtual cubes are disclosed. A virtual cube is a logical representation of a subset of the dimensions and measures of physical cubes maintained by a server, such as an OLAP server. The virtual cube is defined by metadata that maps each dimension and measure of the virtual cube to a corresponding dimension or measure of a physical cube.

One aspect of the system is that the virtual cube is a union of a subset of the dimensions and measures of one or more physical cubes. The virtual cube does not contain any cell data itself, rather the mappings are used to access cell data maintained in the physical cubes contributing dimensions and measures to the virtual cube.

A further aspect of the system is that default members are created in dimensions that are not shared by the contributing physical cubes. The default members can be an automatically created summation of the members of the non-shared dimensions, or an administrator of the system can determine the default members. The default members provide a placeholder index for locating cells or ranges of cells in non-shared dimensions.

A still further aspect of the system is that a query processing component receives a request for a cell in the virtual cube and determines the physical cube cell that corresponds to the virtual cube cell. The query processing component uses the virtual cube metadata to identify the physical cube measure containing the required cell. The query processor then determines if the physical cube cell is in a local cache, of if the cell must be obtained from the OLAP server. After retrieving the physical cube cell from either the local cache or the OLAP server, the query processor returns the cell value to the requester as the value of the virtual cube cell.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, an exemplary virtual cube is described in accordance with embodiments of the invention. In the third section, a system level overview of the invention is presented. In the fourth section, methods of an exemplary embodiment of the invention are provided. Finally, in the fifth section, a conclusion of the detailed description is provided.

Hardware and Operating Environment

Figure 1:
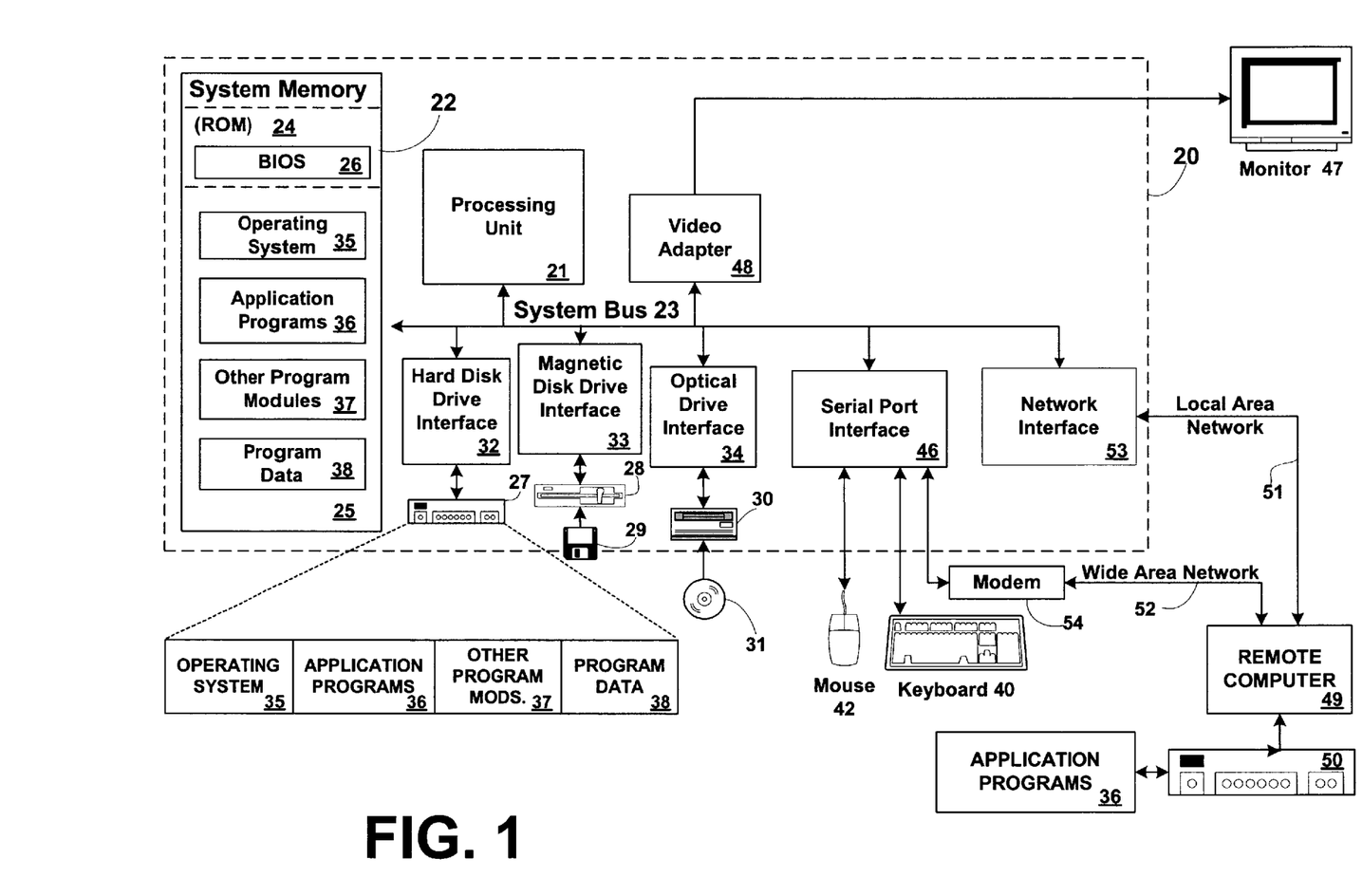
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Exemplary Virtual Cube

In the detailed description that follows, reference will be made to an exemplary virtual cube. In general, a virtual cube is a logical representation of one or more "physical" cubes, where a physical cube is a cube that has cell data allocated in persistent memory or RAM. For instance, cubes as defined by current OLAP systems can be referred to as physical cubes. As discussed above, physical cubes have dimensions and measures that are used as indices to particular cell values. Like physical cubes, virtual cubes also have dimensions and measures used as indices to cell values. A virtual cube is defined as the union of dimensions and measures selected from a subset of the dimensions and measures of one or more physical cubes.

For example, consider two small physical cubes, a retail cube and a product cube. The retail cube has a customer dimension and a time dimension, which can have multiple levels such as year, quarter, and month. In addition, the retail cube has a measure comprising unit sales for particular customers in the customer dimension. Thus, the combination of a particular measure (e.g. Sales) and a particular customer and a particular member of a level in the time dimension specify a cell, whose measure, or value, is the unit sales for that particular time. Table 1 below is a representation of the measures in an exemplary retail cube for a particular time member "T":

TABLE 1

| Customer | Sales |
|---|---|
| Cust. #1 | 20 |
| Cust #2 | 30 |
| Cust #3 | 50 |

The product cube also has an inventory dimension and a time dimension, which, like the retail cube, can have multiple levels. The measure for the product cube is the inventory, in units, from the different sources. Table 2 below is a representation of the data in the product cube for the time member T:

TABLE 2

| Source | Inventory |
|---|---|
| Source #A | 30 |
| Source #B | 30 |
| Source #C | 40 |

In varying embodiments of the invention, a virtual cube can be constructed from the two physical cubes by selecting dimensions and measures from the physical cubes for inclusion in the virtual cube. Using the exemplary physical cubes above, Table 3 is a representation of the virtual cube product_retail comprising the sales measure from the retail cube and the inventory measure from the product cube at a particular point T in their shared dimension time:

TABLE 3

| | All Inventory ($D_I$) | Source #A | Source #B | Source #C |
|---|---|---|---|---|
| All Customers ($D_c$) | 100 | 30 | 30 | 40 |
| Cust #1 | 20 | Null | Null | Null |
| Cust #2 | 30 | Null | Null | Null |
| Cust #3 | 50 | Null | Null | Null |

Two further aspects of virtual cubes are illustrated in the above table. First, it is desirable to have a "default" member in non-shared dimensions. The reason this is desirable relates to the way that virtual cubes are accessed. As noted above, a cell is located using members of each dimension as indices. Thus, even though measures for only one dimension may be desired, a member for every dimension must still be supplied. The creation of a default member in each dimension provides a mechanism to supply such a member.

In the example from Table 3 above, a default member is created in each non-shared dimension. An "All Customers" member ($D_C$) is created in the customer dimension, and an "All Sources" member ($D_I$) is created in the inventory dimension. Thus, if a user desires inventory source data for a particular year, the user can specify the "All Customers" member along with the particular source and time members to locate the correct cell.

A second aspect of virtual cubes is that there are certain cells in the virtual cube that cannot produce a valid measure. For example, it is not valid, nor possible given the available data, to know where the inventory units came from that were sold to a particular customer at a particular time. This is represented in Table 3 by placing nulls in areas for which the data is not valid.

Figure 2:
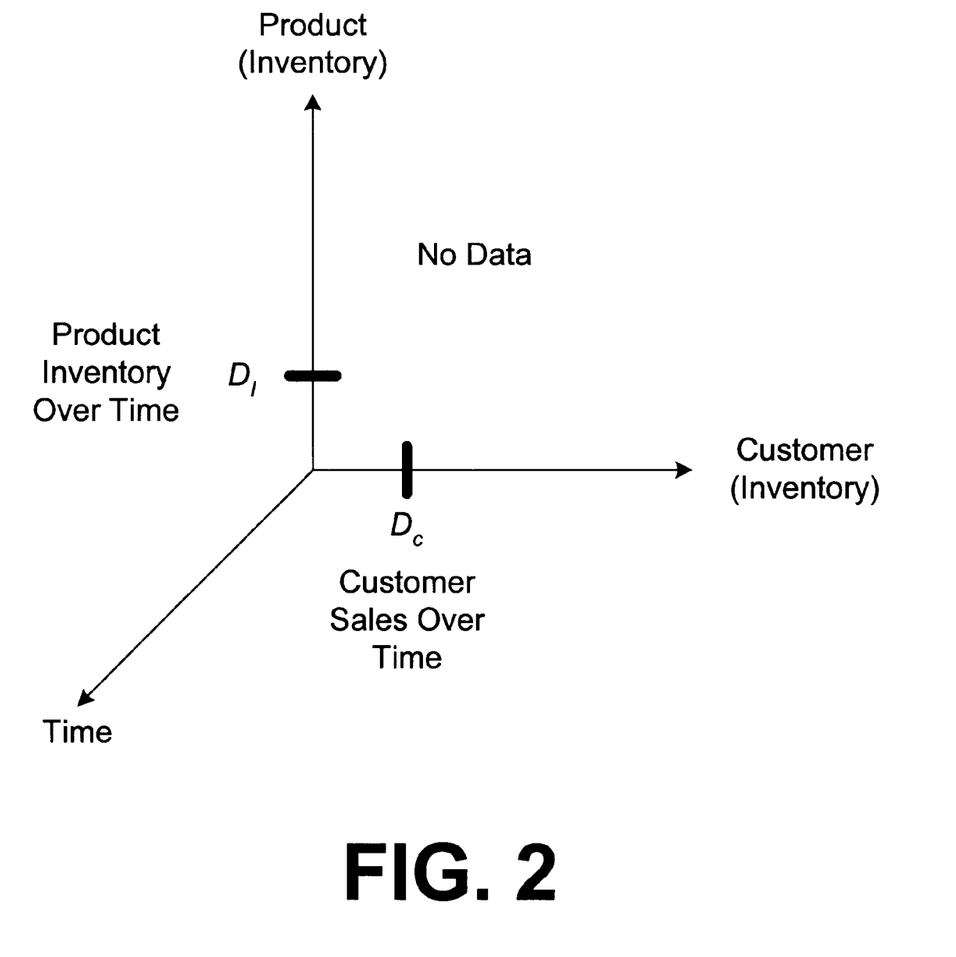
FIG. 2 is a diagram illustrating a domain of data for a virtual cube according to an embodiment of the invention.

The above two aspects are further illustrated in FIG. 2, which is a graph illustrating the dimensions of the product_retail virtual cube. In the graph, the x,y and z axis represent dimensions of the virtual cube. The x axis represents the customer dimension and the y axis the inventory dimension for the virtual cube. The z axis represents the shared dimension, time. In addition, the two default members $D_C$ and $D_I$ have been created along the customer axis and the inventory axis respectively. As illustrated on the graph, physical cube data is provided for customer and time dimension, which is represented by the plane formed by the customer axis and time axis. In addition, physical cube data is provided for the inventory and time dimension, which is represented by the plane formed by the inventory axis and time axis. However, there is no data in the plane formed by the customer axis and inventory axis, because the virtual cube was not defined using a physical cube that maintains measures in both of those dimensions.

The exemplary physical and virtual cubes described above are presented to provide a point of reference for illustrating aspects of the invention. It will be appreciated by those of skill in the art that physical cubes and virtual cubes can, and typically do, have more dimensions and measures than those illustrated above, and that dimensions can have multiple levels. The invention is not limited to cubes having any particular number or type of dimensions, levels, or measures.

System Level Overview

Figure 3:
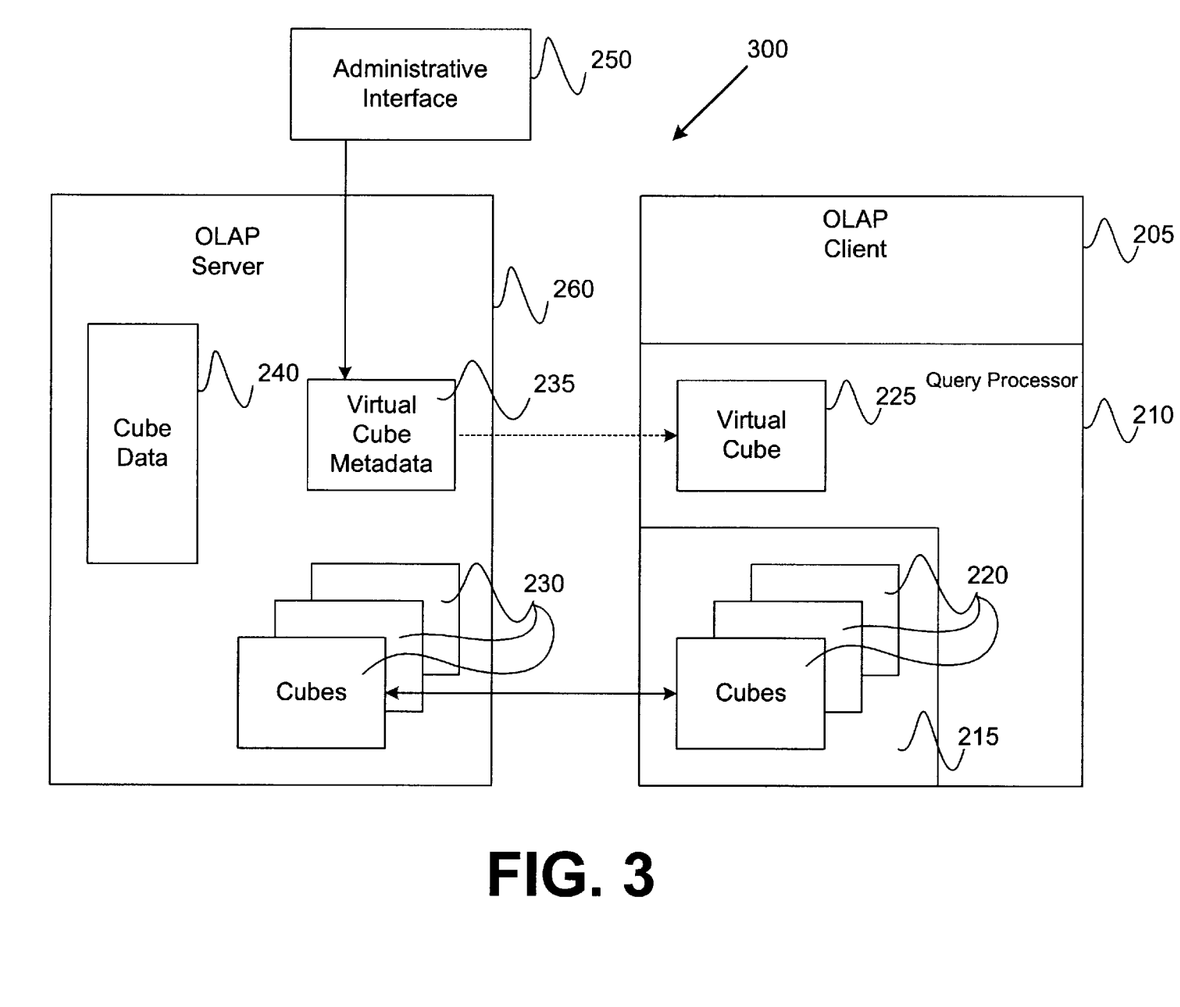
FIG. 3 is a diagram presenting a system level overview of an embodiment of the invention.

A system level overview of the operation of an exemplary embodiment of the invention is described by reference to FIG. 3. The concepts of the invention are described as operating in a multiprocessing, multithreaded virtual memory operating environment on a computer, such as computer 20 in FIG. 1. The operating environment includes an OLAP client 205, OLAP server 260, and administrative interface 250, all of which operate on physical and virtual cubes such as the cubes described in the previous section.

OLAP Server 260 maintains cube definitions and cell data for cubes, and in addition provides OLAP services to one or more client applications, such as OLAP client 205. In one embodiment of the invention, the OLAP server 260 is a version of the SQL Server OLAP Services product from Microsoft Corporation. However, the invention is not limited to any particular OLAP server product, as those of skill in the art will appreciate.

The data maintained by OLAP server 260 includes cube metadata 230, virtual cube metadata 235, and cube data 240. Cube metadata 230 comprises information that defines and describes the cubes maintained by the server. Included in the cube metadata are definitions of the dimensions, levels, and measures that define the cube. It is desirable that dimensions are mapped many-to-many in the cube metadata. In other words, it is desirable that cubes that contain the same type of dimension map to the same definition of the dimension. For example, if more than one cube contains a time dimension, the metadata for each of the cubes containing a time dimension will refer to a single data structure describing the time dimension.

In addition, security information about the cube can be maintained in the cube metadata 230. The security information defines the access rights granted to users of the OLAP server with respect to the cube.

Virtual cube metadata 235 comprises information that defines and describes a virtual cube. Included in the virtual cube metadata 235 are the dimensions and measures that define the virtual cube, and a mapping that indicates the source physical cube providing the dimension or measure for the corresponding virtual cube dimension or measure. It should be noted that mappings for measures are one-to-one, that is, a particular measure always comes from one, and only one, physical cube. Mappings for dimensions can be one-to-one or many-to-one, depending on whether the dimension is shared or not. The dimension mapping will be many-to-one if the dimension is shared by multiple physical cubes contributing dimensions to the virtual cube, and one-to-one if the dimension is not shared.

In one embodiment of the invention, virtual cube metadata 235 is maintained by the OLAP server 260 and read by client 205. However, the invention is not so limited, and in an alternative embodiment of the invention, the virtual cube metadata can be maintained by OLAP client applications such as client 205. In this alternative embodiment, the OLAP client can call Application Program Interface (API) routines supplied as part of the OLAP server system to define the dimensions and measures that are to comprise a virtual cube. This provides the capability for virtual cubes to be created "on demand" as required by an application.

OLAP server 260 maintains the cell values (i.e. the measure data) for cubes 230 in cube data 240. In one embodiment of the invention, cube data 240 is stored in relational format on a persistent storage device such as a disk in a file or database partition that is managed directly by OLAP server 260. However, the invention is not so limited, and in an alternative embodiment, OLAP server 260 interfaces with a relational database system that maintains cube data 240. Examples of such databases include, but are not limited to SQL Server, Oracle, Sybase, Informix etc.

Administrative interface 250 is an application that provides a user interface for configuring and defining entities and attributes in OLAP server 260. For example, administrative interface 250 provides an interface for selecting the dimensions, levels, and measures for a virtual cube. After the virtual cube components have been selected, the administrative interface 250 causes the OLAP server 260 to instantiate the metadata according to the selection. In one embodiment of the invention, the administrative interface 250 is a graphical user interface. A graphical representation of the physical cubes defined in the OLAP server is presented to the user. The administrator selects dimensions from the physical cubes using standard cursor point and click operations as is know in the art. In addition, the administrator can deselect dimensions, levels or measures, resulting in the removal of a previously selected item from the virtual cube. This provides a mechanism to exclude parts of a dimension from a virtual cube. For example, an administrator may want to expose summary levels of a dimension, but may not wish to expose the most detailed level of a dimension. The administrator can remove the most detailed level from the virtual cube, while the higher levels remain.

OLAP client 205 is an application program that requires the services of an OLAP system. OLAP client 205 can be any type of application that interacts with the OLAP system, for example, a data mining application, a data warehousing application, a data analysis application, a reporting application etc.

OLAP client 205 typically interacts with OLAP system 260 by issuing OLAP queries. In one embodiment of the invention, queries are submitted to a query processor component 210 of the client application 205. The query processor component obtains physical cube metadata 220 and virtual cube metadata 225 from the OLAP server 260. Upon receipt of a query from client 205, the query processor determines whether or not the query requires access to a virtual cube. If so, the query processor uses virtual cube metadata 225 to map cells in the virtual cube that are required to answer the query to their corresponding cells in the physical cubes that comprise the virtual cube. The query processor then requests the physical cube cells from the OLAP server 260, and returns the cells to client 205. In one embodiment of the invention, the query processor checks to see if the physical cube cells have been previously cached in a local cache 215. If so, the physical cube cell data is returned to the client from the cache, eliminating the time and resource expense required to obtain the cell data from the OLAP server 260. If the cell data is not currently in the local cache, the physical cube cell data is requested from the OLAP server 260, and returned to the client application 205. In addition, the cell data is cached in local cache 215 for potential later use. No embodiment of the invention requires the use of a cache, and in an alternative embodiment of the invention, all physical cell data is requested and obtained from the OLAP server 260.

It is desirable for query processor 210 to perform the operations described above as part of client application 205 because it provides for better load distribution in a distributed client/server environment. However, the invention is not so limited, and in an alternative embodiment of the invention (not shown), the mapping from virtual cube dimensions to physical cube dimensions is performed in the OLAP server 260.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIGS. 4 and 5. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 4 and 5 are inclusive of the acts required to be taken by an operating environment executing an exemplary embodiment of the invention.

Figure 4:
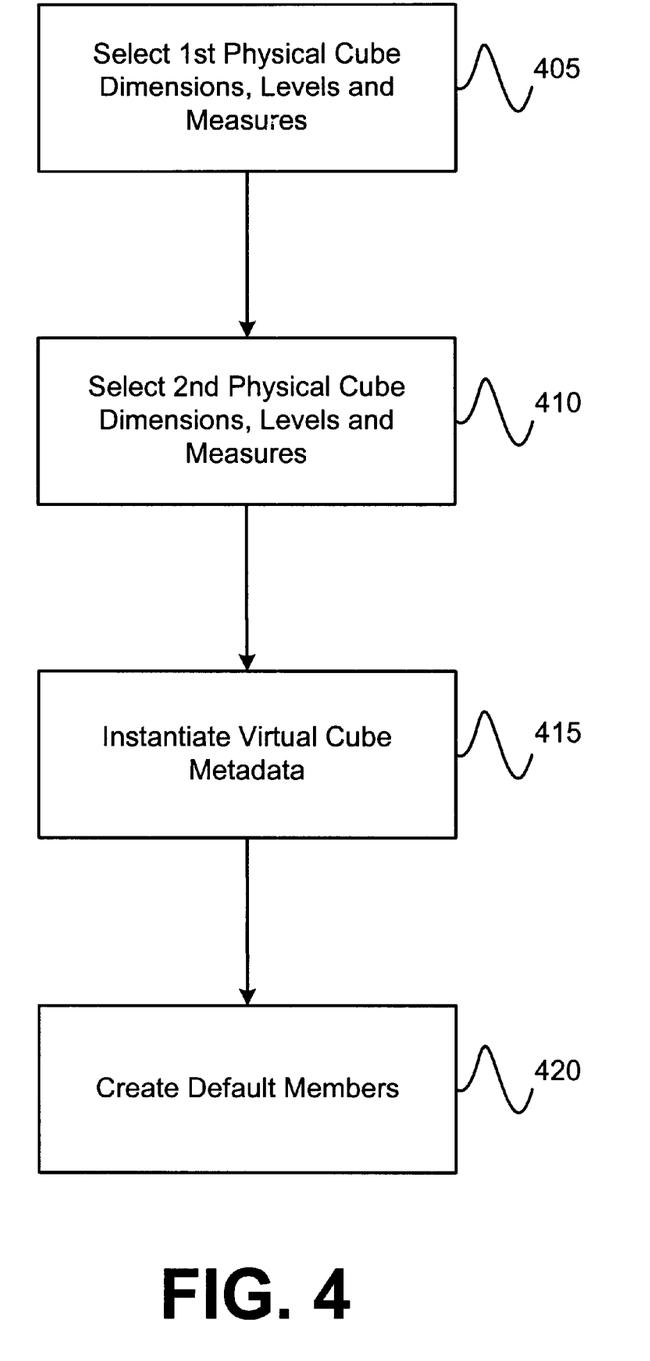
FIG. 4 is a flowchart depicting a process for creating a virtual cube according to an embodiment of the invention.
Figure 5:
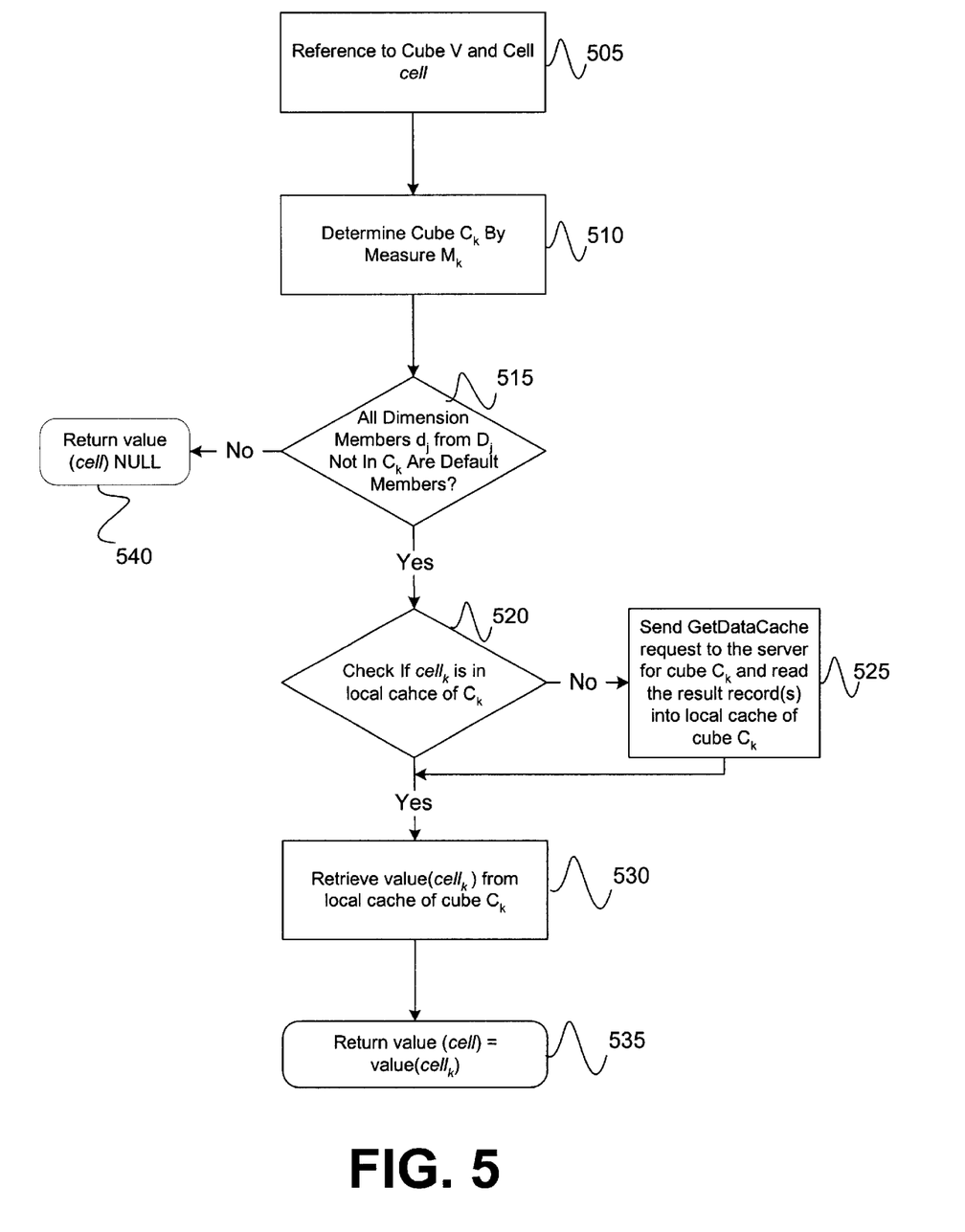
FIG. 5 is a flowchart depicting a process for accessing data in a virtual cube, according to another embodiment of the invention.

A method for creating a virtual cube according to an embodiment of the invention is shown in FIG. 4. A system executing the method, such as system 300 (FIG. 3) begins by selecting a physical cube that will contribute some or all of its dimensions, levels and measures to the virtual cube (block 405). As part of the selection, the specific dimensions, levels and measures of the physical cube that are to contribute to the virtual cube are also selected. Next, in one embodiment of the invention, the system selects a second physical cube that will contribute some or all of its dimensions, levels and measures to the virtual cube (block 410). The dimensions, levels, and measures of the second physical cube that are to contribute to the virtual cube are also selected. Selecting a second physical cube is optional, and in an alternative embodiment of the invention, only one cube contributes dimensions, levels and measures to the virtual cube. In a further alternative embodiment of the invention, additional physical cubes are selected that will contribute dimensions, levels and measures to the virtual cube. No embodiment of the invention is limited to a particular number of physical cubes that can contribute to a virtual cube, and the number of physical cubes that can contribute is limited only by the resources available to the system to represent the virtual cube.

Next, the system causes the virtual cube metadata to be instantiated, that is, to be stored in the OLAP server (block 415). The metadata includes the mappings from dimensions and measures in the virtual cube to the corresponding source measures and dimensions in the physical cube.

Finally, the system creates default members for dimensions that are not shared between contributing physical cubes (block 420). In one embodiment of the invention, the system identifies those dimensions that are not shared, and creates the default members automatically. The value for the default member can be a summation of each of the measures for each member of the dimension. In an alternative embodiment of the invention, an administrator can select a member of the non-shared dimension to become the default member. In a still further embodiment, the administrator can input a value for the default member. The creation of default members is not limited to non-shared dimensions. In an alternative embodiment of the invention, an administrator can create a default member in any of the shared dimensions as well as the non-shared dimensions.

It should be noted that the method described in FIG. 4 does not copy any cell data from the physical cube. In other words, the virtual cube does not contain any cell data of its own. All of the cell data for the virtual cube is obtained by mapping cells from the virtual cube to the physical cube that contributes the dimensions and measures. It is desirable to map to the cell data rather than copy the cell data, because mapping reduces the physical storage required to implement the virtual cube. However, the invention is not limited to mapping cell data, and in an alternative embodiment of the invention (not shown), the cell data is copied from the contributing physical cube cells to corresponding virtual cube cells that occupy physical memory.

FIG. 5 illustrates a method according to an embodiment of the invention for accessing cells in a virtual cube, such as the virtual cube created by the method of FIG. 4. The method begins when a program executing the method requires access to a cell of virtual cube V (block 505). The cell is identified by specifying particular members of the desired dimensions in the query. The system determines which physical cube $C_k$ contains the cell (block 510). This is accomplished by using the virtual cube mapping metadata to determine the measure $M_k$ that maps to the virtual measure containing the cell. As noted above, measure data is mapped one-to-one between virtual and physical cubes, so there is no ambiguity in determining which physical cube contributes its physical measure to the virtual cube.

Next, the system checks to make sure that any dimensions specified in the reference to cell that are not in physical cube $C_k$ are default members of the dimension (block 515). As discussed above in reference to FIG. 2, this check is necessary to eliminate references to data that does not exist, or does not make sense to provide. In one embodiment of the invention, if the check determines that members of dimensions not in $C_k$ are not default members, the system indicates that the value for the cell is the NULL value for the OLAP server (block 540). Returning NULL as the cell value is desirable, because OLAP clients typically ignore NULL values, which is the desired behavior in this case. However, the invention is not limited to returning NULL, and in alternative embodiments of the invention, a "Not Applicable" value is returned, or an error value is returned.

If the check at block 515 determines that all members used to locate cell are either default members or in the same physical cube $C_k$ as the measure $M_k$, then, in one embodiment of the invention, the system checks to see if the physical cell$_k$ is in the local cache of cube $C_k$ (block 520). If not, the system issues a request to the OLAP server 260 to obtain the data for cell$_k$ from $C_k$ and caches the result in the local cache (block 525). In an embodiment of the invention where the OLAP server is the SQL Server OLAP product, the GetDataCache function is used to request the data. In an alternative embodiment of the invention that does not maintain a local cache, the data for cell$_k$ is always obtained from the OLAP server 260.

Otherwise, if the cell data is in the local cache, the value for the cell is read from the cache (block 530). The cell data for cell$_k$ is then returned to the program as the value for cell for the virtual cube (block 535).

Conclusion

Systems and methods for creating and accessing virtual cubes have been described. Virtual cubes have dimensions and measures that are mapped using metadata to subsets of the dimensions and measures of one or more physical cubes.

The systems and methods described provide for advantages not found in previous systems. One advantage is that virtual cubes provide the ability to perform cross cube analysis. The data in cells from multiple physical cubes can be represented as a single virtual cube, thereby aiding in analyzing the data. For example, consider two cubes, a cube Retail and cube Production. Cube Retail has a measure Sales which shows the revenue associated with sales of products to a retail market. Cube Production has a measure Cost which is the production cost of the products. In addition, a Time dimension is present in both cubes, i.e. it is a shared dimension. In order to perform a cross cube or multi-cube analysis in previous system, two queries are required:

SELECT {Sales} ON COLUMNS, {Time.MEMBERS} ON ROWS FROM Retail and

SELECT {Cost} ON COLUMNS, {Time.MEMBERS} ON ROWS FROM Production

However, in the system of the invention, a virtual cube Retail_Production can be designed, where the cube contains the Sales measure from the Retail cube, the Cost measure from the Production cube, and the shared dimension Time. The resulting single query is:

SELECT {Sales, Cost} ON COLUMNS, {Time.MEMBERS} ON ROWS FROM Retail_Production

As can be seen from the above, there is no need to issue multiple queries, nor is there a need to store the results from previous queries to use in later analysis and comparisons with subsequent queries.

A second advantage is that a virtual cube can be treated as completely independent object from the security point of view of an OLAP Server. Thus, the security restrictions applied to virtual cubes are not dependent upon security restrictions applied to the physical cubes from which the virtual cube was built. This provides the ability to implement dimension and measure security in OLAP Services.

In order to provide measure security, an administrator need only make sure that the measures needing protection are excluded from the definition of a virtual cube, and expose only the virtual cube to the user. The administrator can then restrict the user from accessing the physical cube. Because the user only sees the measures in the virtual cube, the unexposed measures in the physical cube are secure.

Similarly, for dimension security, the dimensions needing protection can be excluded from the definition of the virtual cube. The administrator grants access to the virtual cube, while restricting access to the physical cube. Again, the user only sees the dimensions exposed by the virtual cube, and cannot access the unexposed dimensions in the physical cube. The same concept applies to levels within a dimension. If the administrator wishes to protect a particular level, that level is excluded from the definition of the virtual cube, and access to the physical cube is restricted from the user.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while virtual cubes have been described in terms of an OLAP server, other means of storing persistent and/or non-persistent multidimensional data can be readily substituted. The terminology used in this application is meant to include all of these environments. Therefore, it is manifestly intended that this invention be limited only by the following claims and equivalents thereof.

We claim:

1. A computerized system comprising:

a processor and a computer-readable medium;

an operating environment executing on the processor from the computer-readable medium; and an OLAP server operative to maintain for each of a plurality of physical cubes a first data structure defining at least one physical cube dimension and at least one physical cube measure, and a second data structure defining a virtual cube, said second data structure including a mapping from the at least one physical cube dimension to a virtual cube dimension and a mapping from the at least one physical cube measure to a virtual cube measure.

2. The computerized system of claim 1, further comprising an administrative interface operative to select the at least one physical cube measure and the at least one physical cube dimension and to create the second data structure.

3. The computerized system of claim 1, further comprising a data store operative to store the first data structure and the second data structure.

4. The computerized system of claim 3, wherein the data store is a relational database system.

5. The computerized system of claim 1, further comprising a query processor component for use by a client application, said query processor component operative to perform the tasks of:

obtaining the second data structure from the OLAP server, processing a query submitted by the client application, said query requiring a cell of the virtual cube, mapping the cell of the virtual cube to a corresponding cell of the physical cube, obtaining a value of the cell of the physical cube, and returning the value of the cell of the physical cube to the client application.

6. The computerized system of claim 5, wherein the query processor is further operative to define a third data structure defining a virtual cube, said third data structure including a mapping from at least one physical cube dimension to a virtual cube dimension and a mapping from at least one physical cube measure to a virtual cube measure.

7. A computer-readable medium having computer-executable instructions for performing a method for creating a virtual cube, the method comprising:

selecting a first physical cube, a dimension of the first physical cube and a measure of the first physical cube;

creating a mapping from the dimension of the first physical cube to a first dimension of the virtual cube and a mapping from the measure of the first physical cube to a first measure of the virtual cube;

selecting a second physical cube, a dimension of the second physical cube and a measure of the second physical cube;

creating a mapping from the dimension of the second physical cube to a second dimension of the virtual cube and a mapping from the measure of the second physical cube to a second measure of the virtual cube;

wherein the mapping information for the virtual cube is maintained by an OLAP server and made accessible to client applications.

8. The computer-readable medium of claim 7, further comprising creating a default member of the first dimension of the virtual cube and wherein the dimension of the first physical cube is not shared with the second physical cube.

9. The computer-readable medium of claim 7, further comprising copying a set of cell data associated with the measure of the first cube to a measure associated with he virtual cube.

10. A computer-readable medium having computer-executable instructions for performing a method comprising;

identifying a cell of a virtual cube using an identifier comprising at least one member of a dimension and at least one measure;

determining a measure associated with a physical cube that is mapped to the measure of the virtual cube; and if a dimension in the identifier has a member that is not a default member and the dimension is not associated with the physical cube then returning a special value for the cell of the virtual cube, otherwise performing a set of tasks comprising;
retrieving a value for a cell of the measure of the physical cube, and
returning the value for the cell of the measure of the physical cube;

wherein data defining the virtual cube is maintained by the OLAP server and made available to be read by a client.

11. The computer-readable medium of claim 10, wherein the set of tasks further comprises:

determining if the physical cube is in a local cache; and if the physical cube is in the local cache retrieving the value for the cell of the measure of the physical cube from the local cache.

12. The computerized methods of claim 10, wherein the special value is a null value for an OLAP server.

13. A computerized method comprising:

identifying a cell of a virtual cube using an identifier comprising at least one member of a dimension and at least one measure;

determining a measure associated with a physical cube that is mapped to the measure of the virtual cube; and if a dimension in the identifier has a member that is not a default member and the dimension is not associated with the physical cube then returning a special value for the cell of the virtual cube, otherwise performing a set of tasks comprising:
retrieving a value for a cell of the measure of the physical cube, and
returning the value for the cell of the measure of the physical cube;

wherein data defining the virtual cube is maintained by a server and made available to be read by a client.

14. The computerized method of claim 13, wherein the set of tasks further comprises:

determining if the physical cube is in a local cache; and if the physical cube is in the local cache retrieving the value for the cell of the measure of the physical cube from the local cache.

15. The computerized of claim 13, wherein the special value is a null value for an OLAP server.

16. A computerized method for creating a virtual cube, the method comprising:

selecting a first physical cube, a dimension of the first physical cube and a measure of the first physical cube;

creating a mapping from the dimension of the first physical cube to a first dimension of the virtual cube and a mapping from the measure of the first physical cube to a first measure of the virtual cube;

selecting a second physical cube, a dimension of the second physical cube and a measure of the second physical cube;

creating a mapping from the dimension of the second physical cube to a second dimension of the virtual cube and a mapping from the measure of the second physical cube to a second measure of the virtual cube, wherein the mapping information for the virtual cube is maintained by an OLAP server and made accessible to client applications.

17. The computerized method of claim 1, further comprising creating a default member of the first dimension of the virtual cube and wherein the dimension of the first physical cube is not shared with the second physical cube.

18. The computerized method of claim 1, further comprising copying a set of cell data associated with the measure of the first cube to a measure associated with the virtual cube.

* * * * *

UNITED STATES PATENT AND TRADEMARK OFFICE
CERTIFICATE OF CORRECTION

PATENT NO. : 6,477,536 B1
DATED : November 5, 2002
INVENTOR(S) : Mosha Pasumansky et al.

It is certified that error appears in the above-identified patent and that said Letters Patent is hereby corrected as shown below:

<u>Column 2,</u>
Line 50, delete "of" and insert -- or -- therefor;

<u>Column 13,</u>
Line 23, delete "he" and insert -- the -- therefor;
Line 27, delete ";" and insert -- : -- therefor;
Line 37, delete ";" and insert -- : -- therefor;

<u>Column 14,</u>
Line 40, delete "," and insert -- ; -- therefor;
Line 44, delete "1" and insert -- 16 -- therefor;
Line 48, delete "1" and insert -- 16 -- therefor.

Signed and Sealed this

Twelfth Day of August, 2003

JAMES E. ROGAN
*Director of the United States Patent and Trademark Office*